US011345795B2

(12) United States Patent
Granet et al.

(10) Patent No.: US 11,345,795 B2
(45) Date of Patent: May 31, 2022

(54) NATURAL RUBBER

(71) Applicant: COMPAGNIE GENERALE DES ETABLISSEMENTS MICHELIN, Clermont-Ferrand (FR)

(72) Inventors: Françoise Granet, Clermont-Ferrand (FR); Denis Bernard, Clermont-Ferrand (FR); Jérôme Dussillols, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/652,617

(22) PCT Filed: Nov. 15, 2018

(86) PCT No.: PCT/FR2018/052844
§ 371 (c)(1),
(2) Date: Mar. 31, 2020

(87) PCT Pub. No.: WO2019/102109
PCT Pub. Date: May 31, 2019

(65) Prior Publication Data
US 2020/0283598 A1    Sep. 10, 2020

(30) Foreign Application Priority Data
Nov. 23, 2017    (FR) ...................................... 17/61082

(51) Int. Cl.
    C08K 5/41    (2006.01)
    B60C 1/00    (2006.01)
    C08K 3/36    (2006.01)
    C08C 3/02    (2006.01)
    C08L 7/00    (2006.01)

(52) U.S. Cl.
    CPC .................. *C08K 5/41* (2013.01); *B60C 1/00* (2013.01); *C08C 3/02* (2013.01); *C08K 3/36* (2013.01); *C08L 7/00* (2013.01)

(58) Field of Classification Search
    CPC ......... B29B 15/023; B29B 15/06; C08L 7/00; C08C 3/00; C08C 3/02
    (Continued)

(56) References Cited
U.S. PATENT DOCUMENTS
6,492,447 B2    12/2002    Chestnutt et al.
2001/0049411 A1 *  12/2001    Chestnutt ............ C08L 2666/08
                                                                524/419
(Continued)

FOREIGN PATENT DOCUMENTS
CN    1163273 A    10/1997
CN    103709271 A  *  4/2014
(Continued)

OTHER PUBLICATIONS
Google patents translation of CN 103709271 (2014, 8 pages).*
(Continued)

Primary Examiner — Brieann R Johnston
(74) Attorney, Agent, or Firm — Dickinson Wright PLLC

(57) ABSTRACT

A cup lump natural rubber devoid of impurities with a size of greater than 0.5 mm and having a plasticity retention index of greater than 80 is provided. The use of such a natural rubber in a line for manufacturing a semi-finished product based on natural rubber makes it possible to ensure an improved compromise of performances which are the productivity of a line for manufacturing semi-finished products and the quality of the semi-finished products resulting from this production line.

18 Claims, 1 Drawing Sheet

(58) Field of Classification Search
USPC .................................. 528/931; 241/24.27
See application file for complete search history.

(56) References Cited

U.S. PATENT DOCUMENTS

| | | | |
|---|---|---|---|
| 2017/0045294 A1* | 2/2017 | Li | ............................ B29B 13/06 |
| 2020/0317823 A1* | 10/2020 | Dussillols | .................. C08C 3/00 |
| 2021/0088281 A1* | 3/2021 | Li | ............................ B29B 7/842 |

FOREIGN PATENT DOCUMENTS

| | | | | |
|---|---|---|---|---|
| FR | 3041346 A1 | | 3/2017 | |
| FR | 3051795 A1 | * | 12/2017 | ............. B29B 13/06 |
| GB | 1084490 A | * | 9/1967 | ............. B29B 15/02 |
| GB | 1122463 A | * | 8/1968 | ............... C08C 4/00 |
| WO | 2017046204 A1 | | 3/2017 | |
| WO | WO-2018224773 A1 | * | 12/2018 | ............... C08C 3/02 |

OTHER PUBLICATIONS

Google patents translation of WO 2018224773 (2018, 8 pages).*
Susheel Kahalia et al. Natural Rubber: Production, Properties and Applications, Natural Rubber Production, Properties and Applications, pp. 403-436, Sep. 26, 2011, (Sep. 26, 2011), ISBN: 978-1-118, 16479-2. XP002679685. p. 420, table 14-3.
International Search Report and Written Opinion corresponding to PCT/FR2018/052844 dated Mar. 18, 2019.

* cited by examiner

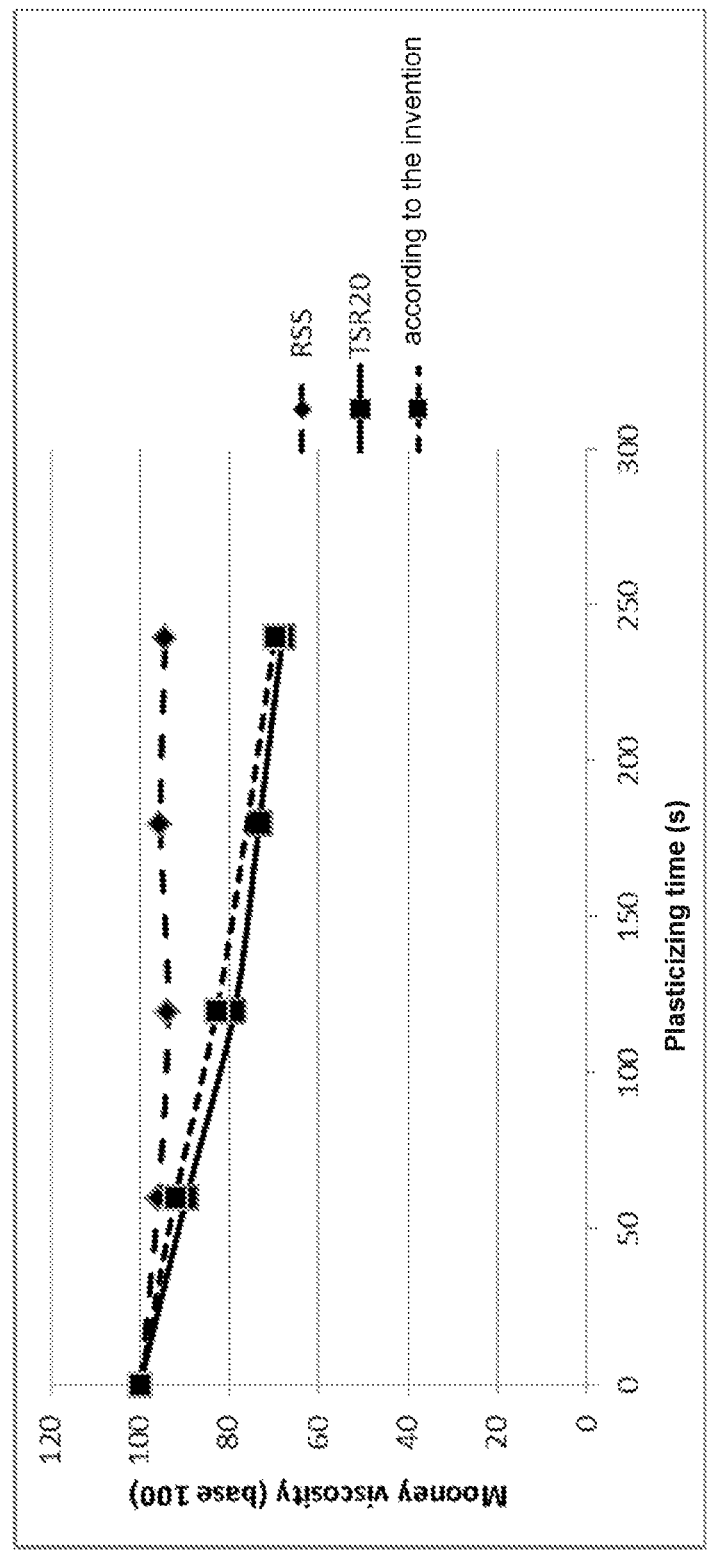

NATURAL RUBBER

This application is a 371 national phase entry of PCT/FR2018/052844, filed on Nov. 15, 2018, which claims benefit of French Patent Application No. 17/61082, filed Nov. 23, 2017, the entire contents of which are incorporated herein by reference for all purposes.

BACKGROUND

1. Technical Field

The present invention relates to a natural rubber and also to a rubber composition based on such a natural rubber and to a semi-finished product containing the rubber composition which are intended to be used in a tire.

2. Related Art

Natural rubber originates from the rubber solids of the natural rubber latex extracted from the rubber tree after tapping: the latex is generally collected in a pot referred to as a cup. The natural rubber is therefore the dry product resulting from the coagulation of the latex. The production of natural rubber is not limited to the tapping of the rubber tree and the collection of the latex, but comprises many other steps which have an impact on the characteristics of the natural rubber. Two major pathways for production of natural rubber are identified, one based on a so-called spontaneous coagulation and the other on a so-called induced coagulation. According to the spontaneous coagulation pathway, the latex coagulates directly in the cup to form a coagulum referred to as "cup lump", a term well known to a person skilled in the art of manufacturing natural rubber. According to the induced coagulation pathway, the still-liquid latex in the cup is decanted, optionally stabilized or centrifuged, then coagulated for example by means of a chemical agent, for example by addition of an acid, to form a latex natural rubber. For example, the natural rubbers commonly used in the tire industry are the TSR20 and RSS grades which are respectively a cup lump natural rubber and a latex natural rubber.

In the production of latex natural rubber, the latex is generally filtered before the coagulation to remove leaves, twigs, sand, earth and other debris which are foreign bodies, also referred to as impurities. In the production of cup lump natural rubber, the cup lump coagulum is itself also contaminated by leaves, twigs, sand, earth and other debris. The removal thereof from the cup lump coagulum conventionally passes through a process which comprises successive operations of shredding and washing in a pool. Unfortunately, this process proves less effective than the latex filtration operations, which results in a cup lump natural rubber which contains not only impurities of larger size, but also impurities in a larger number than the latex natural rubber. Consequently, a smoked sheet of RSS grade natural rubber is considered to be of better quality than a bale of TSR20 grade.

The presence of impurities having a size of greater than 0.5 mm in the cup lump natural rubber may be the cause of the formation of a hole in a thin semi-finished product, in particular during the manufacturing of a semi-finished product containing strips of rubber composition of very fine thickness. Cup lump natural rubber, such as the TSR20 grade may therefore prove problematic in the production of thin semi-finished products. This is why a smoked sheet of RSS grade may be preferred to the TSR20 grade in the production of thin semi-finished products, for example obtained by calendering. Furthermore, the presence of impurities having a size of greater than 0.5 mm or greater than 0.1 mm in a semi-finished product used in a tire may promote the formation of cracks in the semi-finished product, which may reduce the performance of the tire.

Latex natural rubber also differs from cup lump natural rubber by its properties. The difference in properties may be attributed to the maturation phenomenon of the cup lump coagulum, which phenomenon occurs after the tapping. The maturation of the cup lump coagulum is a phenomenon well known to a person skilled in the art and denotes a change in the cup lump coagulum that occurs after the tapping of the rubber tree under the effect of bacteriological or enzymatic actions that might be caused by the contamination of the cup lump coagulum by microorganisms naturally present in the surroundings of the plantations. Typically, a cup lump coagulum is subjected to a long maturation that may range up to several weeks. However it is known that the maturation time has an influence on the plasticity retention index (PRI) of the natural rubber. Typically the PRI of a cup lump natural rubber such as the TSR20 grade is much lower than 80, whereas the PRI of a latex natural rubber such as a smoked sheet of natural rubber of RSS grade is greater than 80. These relative PRI values result, in terms of properties, in a superiority of latex natural rubber with respect to resistance to thermal oxidation. The PRI is also adversely affected by the conditions for drying the natural rubber. The drying in air conventionally used for producing the TSR20 grade which requires high temperatures, 90° C. to 130° C., also contributes towards reducing the PRI.

However it is known that a natural rubber with a high PRI such as a smoked sheet of natural rubber of RSS grade requires plasticization before the use thereof in a rubber composition. The plasticization of a rubber is a step of masticating the rubber intended to reduce its viscosity with a view to improving its processability and facilitating the incorporation and the dispersion of the other ingredients in the rubber during the production of the rubber composition. As plasticization is an additional step in the production of a semi-finished product, it has the consequence of reducing the productivity of a production line for producing the semi-finished product, which reduces the advantage of using an RSS grade instead of the TSR20 grade which does not need to be plasticized for as long as an RSS grade.

Therefore one concern is to provide an alternative to a natural rubber of RSS grade without having the drawbacks mentioned above.

SUMMARY

The Applicant has discovered a cup lump natural rubber which, against all expectation, reconciles a plasticity retention index as high as that of a natural rubber of RSS grade and a processability similar to that of the TSR20 grade. Furthermore, the use of the cup lump natural rubber in accordance with the invention is not problematic in the manufacture of semi-finished products containing strips of rubber composition of very fine thickness.

Thus, a first subject of the invention is a cup lump natural rubber devoid of impurities with a size of greater than 0.5 mm and having a plasticity retention index (PRI) of greater than 80.

A second subject of the invention is a rubber composition comprising a natural rubber in accordance with the invention.

A third subject of the invention is a semi-finished product comprising a rubber composition in accordance with the invention.

A fourth subject of the invention is a tire comprising a rubber composition in accordance with the invention or a semi-finished product in accordance with the invention.

I. DETAILED DESCRIPTION OF EXAMPLE EMBODIMENTS

Any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b). Unless expressly indicated otherwise, all percentages (%) indicated are % by weight.

In the present application, latex natural rubber is intended to mean the latex resulting from tapping the rubber tree.

The natural rubber in accordance with the invention is a cup lump natural rubber, that is to say a rubber resulting from the pathway of spontaneous coagulation of the latex. In other words, it is the solids of the cup lump coagulum. The content of water in the natural rubber is preferentially less than 0.8%.

The cup lump natural rubber in accordance with the invention has the essential feature of having a plasticity retention index (PRI) of greater than 80. Preferably, its PRI is greater than or equal to 85. The PRI is the ratio, expressed as a percentage, of the plasticity of aged natural rubber to the plasticity of the natural rubber before ageing. The determination thereof is used to give an indication of the oxidation resistance of the natural rubber. The higher the value, the better the thermal oxidation resistance and the better the oxidative tensile strength of the polymer chains.

The cup lump natural rubber in accordance with the invention, despite the high PRI, has a good processability which is comparable with that of the TSR20 grade, since it does not require more plasticizing time than the TSR20 grade. The cup lump natural rubber in accordance with the invention therefore has the distinctive feature of reconciling two properties generally known to a person skilled in the art of natural rubber to be conflicting which are the thermal oxidation resistance and the processability.

The cup lump natural rubber in accordance with the invention also has the essential feature of being devoid of impurities with a size of greater than 0.5 mm. An impurity with a size of greater than a dimension X is intended to mean any impurity which is retained by a screen, the mesh size of which is equal to X. For example, an impurity with a size of greater than 0.5 mm is retained on a screen, the mesh size of which is equal to 0.5 mm. The absence of impurities with a size of greater than 0.5 mm gives to the cup lump natural rubber in accordance with the invention a quality gauge for the use thereof in a thin semi-finished product for a tire. Specifically, the occurrence of hole formation in the semi-finished product during the shaping thereof and the probability of crack formation in the semi-finished product are very considerably reduced, or even zero. The cup lump natural rubber in accordance with the invention is preferentially devoid of impurities with a size of greater than 0.1 mm, which makes it possible to reduce even more the occurrence of hole formation in the semi-finished product during the shaping thereof and the probability of crack formation in the semi-finished product.

The grades of natural rubber are conventionally characterized by a content of impurities in the natural rubber. This content of impurities in a natural rubber is well known in the field of natural rubber under the name "dirt content" which refers to a method of the Rubber Research Institute of Malaysia intended for standard Malaysian rubbers. According to this standard, the "dirt content" value expresses the percentage of impurities in the natural rubber which have a size of greater than 44 µm. Preferably, the cup lump natural rubber in accordance with the invention has a content of impurities referred to as a "dirt content" of less than 0.12%. More preferentially, the content of impurities referred to as a "dirt content" in the cup lump natural rubber in accordance with the invention is less than 0.05%. The lower the "dirt content" value, the smaller the proportion of impurities in the natural rubber. A low "dirt content" value helps to further improve the quality of the natural rubber for the use thereof in the manufacture of a semi-finished product.

According to an embodiment of the invention, the cup lump natural rubber in accordance with the invention has a nitrogen content of less than 0.4%. A low content of nitrogen in the natural rubber makes it possible to reduce, for example, the allergenic risk of an article containing natural rubber. The content of nitrogen in the cup lump natural rubber in accordance with the invention is advantageously less than or equal to 0.3%.

According to another embodiment of the invention, the cup lump natural rubber in accordance with the invention is a stabilized natural rubber. A stabilized natural rubber is intended to mean a natural rubber treated by the addition of a viscosity stabilizer. The treatment of natural rubber with a viscosity stabilizer is well known to a person skilled in the art of natural rubber. Viscosity stabilizers are also well known to a person skilled in the art. The treatment of a natural rubber with a viscosity stabilizer is conventionally used to reduce the tendency of the natural rubber to cure during storage.

Any compound known for stabilizing the viscosity of natural rubber may be suitable as viscosity stabilizer useful for the requirements of the invention. Mention may be made, for example, of hydroxylamine and salts thereof, hydroxyalkylamines and salts thereof, semicarbazide, dimedone, compounds having a triazole function and compounds having a hydrazide function. Preferably, the viscosity stabilizer is dimedone, a weak acid salt of compounds of formula $XNH_2$ or a strong acid salt of compounds of formula $XNH_2$ optionally neutralized with a strong base, where X is a group selected from hydroxyl and $C_1$-$C_4$ hydroxyalkyl groups. For the neutralization with a strong base, reference may for example be made to the description of patent application WO2017085109. Very preferentially, the viscosity stabilizer is selected from the group consisting of the compounds of formula $XNH_2$ and the salts of the compounds of formula $XNH_2$, X representing a hydroxyl group or a $C_1$-$C_4$ hydroxyalkyl group, i.e. that contains 1 to 4 carbon atoms. Even more preferentially, the viscosity stabilizer is hydroxylamine sulfate or hydroxylamine sulfate neutralized with sodium hydroxide, very advantageously hydroxylamine sulfate.

According to any one of the embodiments of the invention, the cup lump natural rubber preferentially has a weight-average molar mass of greater than 1 000 000 g/mol. The weight-average molar mass is determined by SEC-RI-MALS (Steric Exclusion Chromatography-differential Refractive Index detectors—Multiangle Light Scattering detector) analysis. The samples of natural rubber are typically placed in solution in tetrahydrofuran for 7 days at 25° C. at a concentration of 5 mg/ml. The soluble fraction is collected and the concentration is adjusted to 2 mg/ml. After filtration at 0.45 µm, 100 µl are injected into a set of columns consisting of four columns from Polymer Lab (2 PLgel Mixed A columns and 2 PLgel mixed B columns), the elution solvent being stabilized tetrahydrofuran (250 ppm of BHT), the flow rate being 0.5 ml/min, the temperature of the system being 35° C., and the analysis time being 90 min. A dual detection system is used: a differential refractometric concentration detector (Optilab T-rEX from Wyatt) and a multiangle light scattering detector (Dawn Heleos from Wyatt).

The cup lump natural rubber in accordance with the invention therefore has a very specific advantage for being used in a rubber composition, in particular for a tire.

The rubber composition which comprises the cup lump natural rubber in accordance with the invention is another subject of the invention. It preferably comprises a reinforcing filler.

The reinforcing filler may be any type of filler referred to as reinforcing, known for its abilities to reinforce a rubber composition that can be used for the manufacture of tires, for example an organic filler such as carbon black, a reinforcing inorganic filler such as silica, with which is combined, in a known way, a coupling agent, or else a mixture of these two types of filler. Such a reinforcing filler typically consists of nanoparticles, the (weight-)average size of which is less than a micrometre, generally less than 500 nm, most commonly between 20 and 200 nm, in particular and more preferentially between 20 and 150 nm. The reinforcing filler may be used at a content of between 30 and 200 parts by weight per hundred parts of the elastomer matrix (phr). An elastomer matrix is understood within the present invention to mean all of the elastomers present in the rubber composition, whether or not they are in accordance with the invention. The rubber composition may contain an elastomer other than the natural rubber in accordance with the invention.

The rubber composition may further contain other additives known for their use in rubber compositions for tires, such as crosslinking agents, plasticizers, antiozonants, antioxidants, extending fillers.

The rubber composition may be manufactured in suitable mixers, using two successive preparation phases well known to a person skilled in the art: a first phase of thermomechanical working or kneading ("non-productive" phase) at high temperature, up to a maximum temperature of between 130° C. and 200° C., followed by a second phase of mechanical working ("productive" phase) down to a lower temperature, typically below 110° C., for example between 40° C. and 100° C., during which finishing phase the crosslinking system is incorporated.

The rubber composition in accordance with the invention, which may be either in the uncured state (before crosslinking or vulcanization), or in the cured state (after crosslinking or vulcanization), may be used in a tire, for example in the form of a semi-finished product for a tire.

The cup lump natural rubber in accordance with the invention may be prepared by a process which comprises the following steps:

a) providing a cup lump coagulum,
b) decontaminating the coagulum,
c) compressing the coagulum at a temperature ranging from 130° C. to 210° C.,
d) subjecting the compressed coagulum to a flash adiabatic expansion at a differential pressure of greater than or equal to 40 bar and preferentially less than 100 bar,
e) drying the coagulum obtained after step d).

The cup lump coagulum collected contains a good number of impurities such as leaves, twigs, sand and other debris. It is subjected to a decontamination step which itself breaks down into two steps: the primary decontamination and the secondary decontamination which takes place after the primary decontamination. The purpose of the primary decontamination is to remove the largest objects and the purpose of the secondary decontamination is to remove smaller objects which have not been removed by the primary decontamination step. To successfully complete the primary decontamination, the cup lump coagulum collected is cut and washed in pools of water according to well-known operations of remilling plants. The secondary decontamination comprises a step of filtering the coagulum under pressure, for example in a device which comprises an extruder and a suitable filtration means installed at the outlet of the extruder. Reference may for example be made to the filtration process described in patent application WO2016162645 or to the one described in patent application FR 17/55046. The process advantageously makes it possible to remove the impurities with a size of greater than 1 mm, advantageously greater than 500 µm, more advantageously greater than 100 µm. As filtration means, a screen or a screen pack, advantageously with a mesh and advantageously borne by a breaker plate, is suitable. The mesh size of the screens advantageously varies from 100 µm to 1 mm. In the secondary decontamination, before being filtered, the coagulum may be shredded, then washed with water in pools, then conveyed for example into creping machines and shredders.

During the decontamination step, the coagulum is advantageously cut into pieces of various sizes to facilitate the processing operations in the decontamination step. The coagulum is also advantageously cut into pieces at the end of the filtration operation.

Preferably, the coagulum at the end of the decontamination step is in the form of crumbs loaded with water, the water content generally being greater than 10%.

Step c) of the process is a compression of the coagulum. This compression is necessary to be able to subsequently subject the coagulum to an adiabatic expansion. In order to apply an adiabatic expansion at a differential pressure of greater than or equal to 40 bar and preferentially less than 100 bar, the pressure to which the coagulum is compressed is typically greater than or equal to 40 bar.

The compression may be carried out in an endless-screw machine equipped with a die at the end of the screw. In order to achieve the pressures useful for the purposes of the invention at the end of the screw in an endless-screw machine, a person skilled in the art may adjust, for example, the coagulum flow rate in the endless-screw machine, the speed of the screw, the geometry thereof, the shape of the holes in the die, or the number or diameter thereof. An extruder fitted at the screw end with a die plate comprising several holes is most particularly preferred.

In the present application, an extruder is intended to mean an endless-screw machine which comprises a material inlet referred to as a hopper, a body formed from a cylinder (also referred to as a barrel), in which an (one or more) endless screw(s) turns, and a head which serves to support a die. This machine makes it possible to apply mechanical drying or thermomechanical drying to a product soaked with a liquid to be removed by drying. Mechanical drying enables the removal of liquid by purely mechanical forces (pressing, draining, etc.). It may be carried out by simple momentum transfer and optionally without heat transfer. Thermomechanical drying is carried out by heating, transferred to the product to be dried by degradation of mechanical energy.

The water included in the product to be dried is in the liquid state under pressure and at high temperature. A release of the stresses until then exerted on the coagulum in the barrel takes place at the die outlet by removal of the compression, which enables the flash adiabatic expansion at the die outlet. At the outlet of the die, the expansion produced makes it possible to flash off the moisture and, where appropriate, depending on the viscosity of the product, to fragment the product.

The extruder useful for the requirements of the invention may be an extruder available on the market, in particular those sold by the companies Anderson, FOM and Welding, such as for example the Expander from Anderson, the Extruder Dryer from FOM, and the VCU from Welding. The extruder useful for the requirements of the invention for any one of the embodiments of the invention is preferably a single-screw extruder.

Variants of extruders are preferential in that they make it possible, at the die outlet, to achieve higher flow rates of coagulum or to promote the adiabatic expansion. Such a preferential variant is an extruder, the barrel of which has, in the feed zone of the extruder, a (one or more) means for discharging water (free water in liquid form). As discharge means, mention may be made of grooves in the thickness of the barrel which open onto the inner surface of the barrel, one or more openings in the feed zone of the extruder, which opening makes it possible to discharge water out of the barrel. These openings may be in the form of a slit, grid, or circular hole. The feed zone is the zone which is under the opening of the hopper.

At the pressure useful for the requirements of the invention in order to carry out the compression, the coagulum is brought, in step c), to a temperature ranging from 130° C. to 210° C. In an endless-screw machine as an extruder, mechanical work under high pressure is accompanied by heating of the rubber material of the coagulum, which has the effect of increasing the temperature of the coagulum. The temperature must not exceed 210° C., so as not to degrade the polyisoprene chains. Below 130° C., the process is not sufficiently effective to reduce the moisture content of the natural rubber. Preferably, the temperature is between 170° C. and 210° C. More preferentially, the coagulum is compressed in step c) at a temperature between 180° C. and 210° C. To achieve the temperatures useful for the requirements of the invention, heat may also be provided by heating the means used to carry out the compression, for example by heating the inside of a screw machine such as the barrel of an extruder, by means of a jacket.

The length of time for which the coagulum is subjected to the compression at the temperature and at the pressure useful for the requirements of the invention is relatively short, so as not to degrade the polyisoprene chains, but is sufficient to supply the amount of heat sufficient to be able to reduce the residual moisture of the natural rubber.

The adiabatic expansion carried out in step d) is characterized as flash expansion in that it enables the coagulum to go from a compressed state to a non-compressed state virtually instantaneously, typically in a length of time of less than a second. It is carried out at a differential pressure of greater than or equal to 40 bar and preferentially less than 100 bar. Preferably the differential pressure is from 40 bar to 80 bar. Since the expansion is adiabatic, the expansion occurs at the temperature at which the compression was carried out. At the end of expansion, the coagulum is generally at atmospheric pressure.

Preferably, step c) and step d) are carried out in one and the same endless-screw machine, the endless-screw machine being an extruder equipped at the end of the screw with a perforated die plate.

At the moment of the expansion carried out in step d), the greater the outer surface of the coagulum in contact with the atmosphere, the greater the exchange surface of the coagulum with the atmosphere, and the more effective the process. Consequently, it is preferable for the coagulum to have as large a surface per unit volume as possible at the moment of the expansion. Thus, step d) advantageously comprises a transformation of the coagulum into crumbs. For example, in the case of an expansion at the die outlet of an extruder, the coagulum may be cut by installing means able to cut the coagulum at the die outlet, such as a blade or a pelletizer, preferentially a pelletizer. Such devices comprising a pelletizer at the die outlet at the screw end of an extruder are well known for being used in processes for manufacturing synthetic rubbers.

The process comprises, after step d), a drying step e). This convective drying step makes it possible to produce a natural rubber with a residual moisture typically of less than 0.8%. The drying is advantageously a convective drying in air. The convective drying temperature is preferentially within a range extending from 110° C. to 150° C. It is adjusted as a function of the residual moisture in the natural rubber at the end of step d) and of the extended surface to be dried. The convective drying time is adjusted by a person skilled in the art as a function of the convective drying temperature and as a function of the residual water content in the coagulum at the end of step d). A convective drying time that is as short as possible is preferred to preserve the structure of the polyisoprene chains of the natural rubber and the properties thereof. Typically, the convective drying time is less than 10 minutes so as to obtain a natural rubber containing less than 0.8% of water. Any known convection drying means may be suitable such as for example a fluidized bed such as a vibrating screen, which is a known device conventionally used in processes for manufacturing synthetic rubbers. In particular, a hot-air fluidized bed such as a hot-air vibrating screen is preferred.

A divided form of the coagulum is also preferred for the drying step. For the same reasons as those put forward for step d), the divided form makes it possible to improve the effectiveness of the drying step in order to obtain a residual moisture of less than 0.8% in the natural rubber, in particular by reducing the duration of the drying step. Thus, in the drying step, the natural rubber is advantageously in the form of crumbs. Consequently, if step d) comprises a transformation of the coagulum into crumbs, the natural rubber is advantageously maintained in the form of crumbs in order to be able to undergo the drying step in divided form.

In order to prepare the cup lump natural rubber in accordance with one of the embodiments of the invention, the process comprises a supplementary step which is the addition of a viscosity stabilizer to the dried natural rubber (step f) in order to stabilize the viscosity of the natural rubber. Any compound known for stabilizing the viscosity of natural rubber may be suitable as viscosity stabilizer useful for the requirements of the invention. Mention may be made, for example, of hydroxylamine and salts thereof, hydroxyalkylamines and salts thereof, semicarbazide, dimedone, compounds having a triazole function and compounds having a hydrazide function. Preferably, the viscosity stabilizer is dimedone, a weak acid salt of compounds of formula $XNH_2$ or a strong acid salt of compounds of formula $XNH_2$ optionally neutralized with a strong base, where X is a group selected from hydroxyl and $C_1$-$C_4$ hydroxyalkyl groups. For the neutralization with a strong base, reference may for example be made to the description of patent application WO2017085109. Very preferentially, the viscosity stabilizer is selected from the group consisting of the compounds of formula $XNH_2$ and the salts of the compounds of formula $XNH_2$, X representing a hydroxyl group or a $C_1$-$C_4$ hydroxyalkyl group, i.e. that contains 1 to 4 carbon atoms. Even more preferentially, the viscosity stabilizer is hydroxylamine sulfate or hydroxylamine sulfate neutralized with sodium hydroxide, very advantageously hydroxylamine sulfate.

The addition of the viscosity stabilizer to the natural rubber is typically carried out by sprinkling the natural rubber with the desired amount of viscosity stabilizer, the natural rubber preferably being in the form of crumbs. In order to do this, the viscosity stabilizer is generally dissolved in water in order to be able to carry out the sprinkling of the natural rubber. The viscosity stabilizer is preferentially added in an amount ranging from 2.4 mmol to 24 mmol, more preferentially from 6 mmol to 24 mmol, more preferentially still from 8 mmol to 18 mmol equivalent of dimedone or equivalent of $XNH_2$ per kilogram of natural rubber.

The step of adding the viscosity stabilizer is preferentially followed by mechanical working at a temperature of at least 100° C. The mechanical working, which has the role of dispersing the viscosity stabilizer in the natural rubber, may be carried out by means of a shredding or homogenizing device. Typically, it is carried out by means of a machine known as a "prebreaker".

A prebreaker is a shredding and homogenizing device well known to a person skilled in the art of natural rubber, since it is conventionally used in natural rubber remilling plants. Reference may be made, for example, to patent application WO 2015189365 which gives a detailed description of a prebreaker.

The aforementioned features of the present invention, and also others, will be better understood on reading the following description of several exemplary embodiments of the invention, given by way of illustration and without limitation.

II. Exemplary Embodiments

Preparation of the Cup Lump Natural Rubber According to the Invention:

A cup lump coagulum is collected. A primary decontamination is applied to the coagulum (slab cutter, wet prebreakers). In order to carry out the secondary decontamination, use is made of a device which comprises five creping machines in series and a machine comprising a first extruder, a gear pump and a breaker plate installed at the outlet of the endless-screw machine, the gear pump being positioned at the end of the screw and before the screen pack. The characteristics of the device are the following:

Single-Screw Extruder:
    Screw diameter (D): 60 mm with constant root diameter and constant screw pitch
    Screw length: 14 D
    Barrel with a smooth inner surface which extends from the end of the feed zone to the end of the barrel closest to the outlet of the extruder. The feed zone is grooved.

Gear Pump:
    Gear pump with a displacement of 176 $cm^3$/turn

Screen Pack:
    Screen pack diameter: 168 mm
    Screen pack mesh: a screen with a 500 µm mesh+2 screens with a 2.5 mm mesh Therefore, the first extruder is fed with crumbs of coagulum loaded with water (18%). The pressure and the temperature at the inlet of the screen pack are 290 bar and 95° C., the throughput is 100 kg/h. The speed of the extrusion screw is regulated so as to correctly feed the gear pump. The speed of the gear pump is regulated so as to obtain the throughput of filtered natural rubber. At the outlet of the filtration step, the coagulum is cut into pieces of variable size. A coagulum is recovered that has a moisture content of greater than 10%. It is observed that the impurities with a size of greater than the mesh of the screens are indeed retained on the screens, that the meshes of the screens are not impaired after filtration and thus the coagulum which is obtained after filtration is indeed decontaminated.

A second extruder is then fed with the decontaminated and cut coagulum. The extruder is a single-screw extruder, it is equipped with a perforated die at the end of the screw and with a pelletizer positioned at the die outlet. The extruder comprises a jacket, its barrel has, in the feed zone, means for discharging water (grooves, slits, holes). The speed of the screw is 150 rpm, the pressure is 62 bar, the temperature of the coagulum is 186° C., the temperature and pressure being measured by sensors positioned as close as possible to the die, between the die and the tip of the screw closest to the die. At the outlet of the extruder, a natural rubber is recovered in the form of crumbs which are then dried on a hot-air vibrating screen at a temperature of 120° C. for around 5 minutes. The natural rubber is recovered, its moisture content being less than 0.8%.

The natural rubber is then sprinkled with an aqueous solution of hydroxylamine sulfate prepared with 150 grams of hydroxylamine sulfate per litre of solution. An amount by weight of hydroxylamine sulfate relative to the natural rubber, in phr, of 0.08 is placed on the natural rubber, then the natural rubber thus sprinkled is introduced into a prebreaker, the temperature of the natural rubber in the prebreaker being 110° C. The natural rubber is recovered and it is left to cool.

Its moisture content, its nitrogen content, its plasticity retention index (PRI), its dirt content and its Mooney viscosity are measured.

The water content is determined with a Mettler Toledo HB43-S halogen desiccator. The desiccator is an automated device which incorporates a crucible, a balance and a cover intended to close the crucible. The crucible is positioned on the balance. The cover comprises a means for heating by a halogen lamp, this heating means being triggered when the cover is lowered onto the crucible. In the crucible, a sample of 10 grams of natural rubber is weighed exactly: the device records the weight corresponding to "a". The cover is lowered to close the crucible, which triggers the temperature rise to reach a setpoint of 160° C. When the device detects a reduction in weight of less than 0.001 g per minute, the device takes a reading of a weight "b". The water content in the sample is given as percentage by weight by the following equation:

$$\text{Water content (\%)} = 100 * ((a-b)/a)$$

The nitrogen content is measured according to standard ASTM D 3533-90.

The PRI is measured according to standard ASTM D 3194-04.

The dirt content is determined according to the method described by the document entitled "RRIM TEST METHODS FOR STANDARD MALAYSIAN RUBBERS", *SMR Bull. No. 7 Rubb. Res. Inst. Malaysia*, 1992 revised edition, by Yu Tong, published and printed by the Rubber Research Institute of Malaysia, Part B 0.4.

In order to measure the Mooney viscosity, use is made of an oscillating consistometer as described in French standard NFT 43-005 (November 1980). The Mooney viscosity is measured according to the following principle: the natural rubber is moulded in a cylindrical chamber heated to 100° C. After preheating for one minute, the rotor rotates within the test specimen at 2 rpm and the working torque for maintaining this movement is measured after 4 minutes of 8 rotations. The Mooney viscosity (ML 1+4) is expressed in "Mooney unit" (MU, with 1 MU=0.83 newton·metre).

Results:

FIG. 1 is a graphical representation of the change in the value of the Mooney viscosity of a natural rubber given as a function of the plasticizing time. In this representation, the initial Mooney viscosity of a given natural rubber is equal to 100 by convention. The initial viscosity of a natural rubber refers to the viscosity before any plasticization. Table 1 lists the measured values of PRI, nitrogen content, water content, dirt content, Mooney viscosities before and after plasticization of the cup lump natural rubber according to the invention and also the maximum size of the impurities present in the cup lump natural rubber according to the invention. For comparison, the values measured for the TSR20 grade are also indicated.

Table 1 shows that the cup lump natural rubber according to the invention has a PRI much higher than that of the TSR20 grade. FIG. 1 also shows that the cup lump natural rubber according to the invention and the TSR20 grade see their viscosity change in a similar manner during the plasticization. Table 1 also shows that the cup lump natural rubber according to the invention has Mooney viscosities very similar to those of the TSR20 grade, whether this is before, during or after plasticization.

In summary, although it has a PRI higher than the TSR20 grade, the cup lump natural rubber according to the invention does not require more plasticizing time than the TSR20 grade. Surprisingly, the cup lump natural rubber according to the invention has a PRI much higher than the TSR20 grade while having a processability comparable to that of the TSR20 grade.

The change in the Mooney viscosity of the RSS grade as a function of the plasticizing time is also represented in FIG. 1, the PRI of the RSS grade being 83, its water content being less than 0.8%, its nitrogen content being 0.5% and its dirt content being 0.009. Whereas the cup lump natural rubbers see their Mooney viscosity reduce by more than 20% after 250 seconds of plasticization, the reduction in the Mooney viscosity of the RSS grade is no more than 5% after the same plasticizing time. FIG. 1 clearly shows that the RSS grade requires a much longer plasticizing time.

Furthermore, from the point of view of the impurities, the cup lump natural rubber is of much better quality than the TSR20 grade as shown by the values of the dirt content and maximum size of the impurities present in the natural rubber. In this regard, its quality approaches that of the RSS grade. Conversely, since the TSR20 grade is cleaned solely by successive operations of shredding and of washing in a pool, it generally contains objects with a size much greater than 0.5 mm, such as sand, leaf debris, bark debris.

The cup lump natural rubber according to the invention has the advantage of simultaneously having the processing properties of the TSR20 grade and the thermal oxidation resistance properties of the RSS grade while having a purity which approaches that of the RSS grade. The use of a natural rubber in accordance with the invention in a production line for producing a semi-finished product based on natural rubber makes it possible to ensure an improved compromise of performances which are the productivity of a production line for producing semi-finished products and the quality of the semi-finished products resulting from this production line.

TABLE 1

|  | according to the invention | TSR20 |
| --- | --- | --- |
| Water content | <0.8% | <0.8% |
| Nitrogen content | 0.36 | 0.37 |
| PRI | 89 | 74.5 |
| Dirt content | 0.043 | 0.038 |
| Size of the impurities | ≤0.5 mm | ND* |
| ML before plasticization | 98 | 95 |
| ML after plasticization | 82 | 78 |

*ND not determined

The invention claimed is:

1. A cup lump natural rubber, the cup lump natural rubber being devoid of impurities with a size of greater than 0.5 mm, and the cup lump natural rubber having a plasticity retention index of greater than 80.

2. The cup lump natural rubber according to claim 1 having a plasticity retention index of greater than or equal to 85.

3. The cup lump natural rubber according to claim 1 having a weight content of impurities of less than 0.12%.

4. The cup lump natural rubber according to claim 1 having a weight content of impurities of less than 0.05%.

5. The cup lump natural rubber according to claim 1, wherein the cup lump natural rubber has a water content of less than 0.8% by weight.

6. The cup lump natural rubber according to claim 1 having a weight content of nitrogen of less than 0.4%.

7. The cup lump natural rubber according to claim 1 having a weight content of nitrogen of less than or equal to 0.3%.

8. The cup lump natural rubber according to claim 1, wherein the cup lump natural rubber is devoid of impurities with a size of greater than 0.1 mm.

9. The cup lump natural rubber according to claim 1, wherein the cup lump natural rubber is a stabilized natural rubber.

10. The cup lump natural rubber according to claim 9, wherein the cup lump natural rubber is a natural rubber stabilized by a viscosity stabilizer selected from the group consisting of the compounds of formula $XNH_2$ and the salts of the compounds of formula $XNH_2$, X representing a hydroxyl group or a $C_1$-$C_4$ hydroxyalkyl group.

11. The cup lump natural rubber according to claim 10, in which the viscosity stabilizer is hydroxylamine sulfate or hydroxylamine sulfate neutralized with sodium hydroxide.

12. The cup lump natural rubber according to claim 1, wherein the cup lump natural rubber has a weight-average molar mass of greater than 1,000,000 g/mol.

13. A rubber composition comprising the natural rubber defined in claim 1.

14. The rubber composition according to claim 13, further comprising a reinforcing filler.

15. A semi-finished product comprising the rubber composition defined in claim 14.

16. A tire comprising the rubber composition defined in claim 14.

17. The cup lump natural rubber according to claim 11, wherein the viscosity stabilizer is hydroxylamine sulfate.

18. A tire comprising the semi-finished product defined in claim 15.

\* \* \* \* \*